(12) United States Patent
Biskeborn et al.

(10) Patent No.: US 8,493,691 B2
(45) Date of Patent: Jul. 23, 2013

(54) TAPE DRIVE SYSTEM

(75) Inventors: Robert Glenn Biskeborn, Hollister, CA (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/531,404

(22) Filed: Jun. 22, 2012

(65) Prior Publication Data

US 2012/0262818 A1 Oct. 18, 2012

Related U.S. Application Data

(63) Continuation of application No. 11/851,587, filed on Sep. 7, 2007, now Pat. No. 8,243,396.

(51) Int. Cl.
*G11B 5/56* (2006.01)

(52) U.S. Cl.
USPC .......................................... 360/291

(58) Field of Classification Search
USPC ............... 360/84, 85, 90, 96.61, 130.2, 291, 360/261.1, 77.12, 125.31, 294.7, 129, 241.1
See application file for complete search history.

(56) References Cited

U.S. PATENT DOCUMENTS

| | | |
|---|---|---|
| 2,644,690 A | 7/1953 | Krag |
| 3,585,313 A | 6/1971 | Newell |
| 3,592,976 A | 7/1971 | McGinnis |
| 3,688,956 A | 9/1972 | Kjos |
| 4,054,929 A | 10/1977 | Levy |
| 4,150,773 A * | 4/1979 | Fell et al. ...................... 226/192 |
| 4,789,903 A * | 12/1988 | Kamada et al. ................ 358/296 |
| 4,939,715 A | 7/1990 | Vogelgesang et al. |
| 4,956,737 A | 9/1990 | Brock |
| 5,289,331 A | 2/1994 | Eaton et al. |
| 5,585,977 A * | 12/1996 | Gooch ............................ 360/84 |
| 5,751,527 A | 5/1998 | Sundaram et al. |
| 5,774,306 A | 6/1998 | Wang et al. |
| 5,982,592 A | 11/1999 | Saito et al. |
| 6,142,403 A * | 11/2000 | Gelardi et al. ............. 242/343.1 |
| 6,151,191 A | 11/2000 | Muftu et al. |
| 7,006,329 B2 | 2/2006 | Johnson et al. |
| 7,050,264 B2 | 5/2006 | Yip et al. |
| 7,054,101 B1 | 5/2006 | Marion et al. |
| 7,339,874 B2 * | 3/2008 | Biskeborn ....................... 369/95 |

(Continued)

OTHER PUBLICATIONS

Non-Final Office Action Summary from U.S. Appl. No. 11/851,587 dated Jun. 24, 2010.

(Continued)

*Primary Examiner* — Allen T Cao
(74) *Attorney, Agent, or Firm* — Zilka-Kotab, PC

(57) ABSTRACT

A tape drive system according to one embodiment includes a support for engaging a tape; and a head directly opposing the tape engaging portion of the support, the head being for performing at least one of reading from a tape and writing to a tape. During an operation period, the head is positioned such that at least one of the following occurs: the head does not contact the tape for a majority of the operation period; the head does not contact the tape for at least a portion of the operation period; and the head engages the tape for at least a portion of the operation period when the tape is lifted from the support by a cushion of air formed between the support and the tape, the head pressing the tape into the air cushion when engaging the tape.

18 Claims, 11 Drawing Sheets

U.S. PATENT DOCUMENTS

| | | |
|---|---|---|
| 8,243,396 B2 | 8/2012 | Biskeborn et al. |
| 2006/0027694 A1 | 2/2006 | Johnson et al. |
| 2006/0032969 A1 | 2/2006 | Bloomquist et al. |
| 2008/0253020 A1* | 10/2008 | Gierak et al. ............ 360/110 |
| 2009/0001207 A1* | 1/2009 | Tresso et al. ............ 242/348 |
| 2009/0067097 A1 | 3/2009 | Biskeborn et al. |
| 2010/0035088 A1* | 2/2010 | Inoue ............ 428/846 |
| 2010/0110585 A1* | 5/2010 | Takano et al. ............ 360/123.12 |
| 2012/0154950 A1* | 6/2012 | Fasen et al. ............ 360/84 |

OTHER PUBLICATIONS

Final Office Action Summary from U.S. Appl. No. 11/851,587 dated Feb. 24, 2011.

Non-Final Office Action Summary from U.S. Appl. No. 11/851,587 dated Jan. 17, 2012.

Notice of Allowance and Fee(s) Due from U.S. Appl. No. 11/851,587 dated Apr. 4, 2012.

* cited by examiner

TAPE DRIVE SYSTEM

RELATED APPLICATIONS

This application is a continuation of U.S. patent application Ser. No. 11/851,587 filed Sep. 7, 2007, which is herein incorporated by reference.

BACKGROUND

The present invention relates to tape drive systems, and more particularly, this invention relates to a tape drive system with at least partially constrained tape-head contact.

Business, science and entertainment applications depend upon computing systems to process and record data. In these applications, large volumes of data are often stored or transferred to nonvolatile storage media, such as magnetic discs, magnetic tape cartridges, optical disk cartridges, floppy diskettes, or floptical diskettes. Typically, magnetic tape is the most economical, convenient, and secure means of storing or archiving data.

Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is currently measured in hundreds of gigabytes.

The current method of wrapping the tape over the head during tape drive operation does not in general allow constraining the contact between head and tape. In addition, it is well known that wrapped configurations may produce considerable effects. For example, spacing loss due to gap recession and debris accumulations on the head negatively affects performance. These debris accumulations can sometimes cause shorting of critical head elements. As tapes get smoother, stiction and running friction may become concerns. Another difficulty can be tape shifting and dynamic skew. Solutions such as coating tape heads may address one issue such as preventing shorting due to tape debris, but may cause increased susceptibility to stiction. There are no known solutions that improve upon all of these concerns.

An example of the current method of wrapping the tape over the head during tape drive operation is shown in FIG. 1, which illustrates a traditional flat-lapped bi-directional, two-module magnetic tape head 100, in accordance with the prior art. As shown, the head includes a pair of bases 102, each equipped with a module 104. The bases are typically "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

Two common parameters are associated with heads of such design. One parameter includes the tape wrap angles $\alpha_i$, $\alpha_o$ defined between the tape 108 and a plane 111 in which the upper surface of the tape bearing surface 109 resides. It should be noted that the tape wrap angles $\alpha_i$, $\alpha_o$ includes an inner wrap angle $\alpha_i$ which is often similar in degree to an external, or outer, wrap angle $\alpha_o$. The tape bearing surfaces 109 of the modules 104 are set at a predetermined angle from each other such that the desired inner wrap angle $\alpha_i$ is achieved at the facing edges. Moreover, a tape bearing surface length 112 is defined as the distance (in the direction of tape travel) between edges of the tape bearing surface 109. The wrap angles $\alpha_i$, $\alpha_o$ and tape bearing surface length 112 are often adjusted to deal with various operational aspects of heads such as that of FIG. 1, in a manner that will soon become apparent.

During use of the head of FIG. 1, various effects traditionally occur. FIG. 2A is an enlarged view of the area encircled in FIG. 1. FIG. 2A illustrates a first known effect associated with the use of the head 100 of FIG. 1. When the tape 108 moves across the head as shown, air is skived from below the tape 108 by a skiving edge 204 of the substrate 104A, and instead of the tape 108 lifting from the tape bearing surface 109 of the module (as intuitively it should), the reduced air pressure in the area between the tape 108 and the tape bearing surface 109 allows atmospheric pressure to urge the tape towards the tape bearing surface 109.

To obtain this desirable effect, the wrap angle $\alpha_o$ is carefully selected. An illustrative wrap angle is about 0.8°±0.2. Note, however, that any wrap angle greater than 0° results in tents 202 being formed in the tape 108 on opposite edges of the tape bearing surface 109. This effect is a function of tape stiffness and tension. For given geometrical wrap angles for example, stiffer tapes will have larger tents 202.

If the wrap angle $\alpha_i$, $\alpha_o$ is too high, the tape 108 will tend to lift from the tape bearing surface 109 in spite of the vacuum. The larger the wrap angle, the larger the tent 202, and consequently the more air is allowed to enter between the tape bearing surface 109 and tape 108. Ultimately, the forces (atmospheric pressure) urging the tape 108 towards the tape bearing surface 109 are overcome and the tape 108 becomes detached from the tape bearing surface 109.

If the wrap angle $\alpha_i$, $\alpha_o$ is too small, the tape tends to exhibit tape lifting 205, or curling, along the side edge of the tape bearing surface 109 as a result of air leaking in at the edges and tape mechanical effects. This effect is shown in FIG. 2B. Particularly, the edges of the tape curl away from the tape bearing surface 109, resulting in edge loss or increased spacing between the edges of the tape and the tape bearing surface 109. This is undesirable, as data cannot reliably be written to the edges of a tape in a system subject to edge loss.

Additionally, the tape lifting 205 results in additional stress at points 206 which, in turn, may cause additional wear. Further augmenting such tape lifting 205 is the fact that the tape 108 naturally has upturned edges due to widespread use of technology applied in the video tape arts.

Beyond this relatively unconstrained head-tape contact, which is largely due to air skiving, the tape itself is unconstrained against lateral transient disturbances in the free span between tape guides where the head is located. These disturbances can produce mistracking between head and tape, and force, for example, cessation of the writing process.

Furthermore, other disturbances such as in tension can produce stick-slip conditions, mistracking and head-tape-spacing modulation.

BRIEF SUMMARY

A tape drive system according to one embodiment includes a support for engaging a tape, a tape engaging portion of the support having a rounded shape; and a head directly opposing the tape engaging portion of the support, the head being for performing at least one of reading from a tape and writing to a tape. Dining an operation period when the head is reading from or writing to a tape, the head is positioned such that at least one of the following occurs: the head does not contact the tape for a majority of the operation period; the head does not contact the tape for at least a portion of the operation period; and the head engages the tape for at least a portion of the operation period when the tape is lifted from the support by a cushion of air formed between the support and the tape, the head pressing the tape into the air cushion when engaging the tape.

A tape drive system according to another embodiment includes a support for engaging a tape, where the support includes a roller adapted for engaging a tape wrapped around at least a portion of an outer surface thereof, and where an outer surface of the roller has a material layer for increasing friction between the tape and the support.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

DETAILED DESCRIPTION

Figure 1:
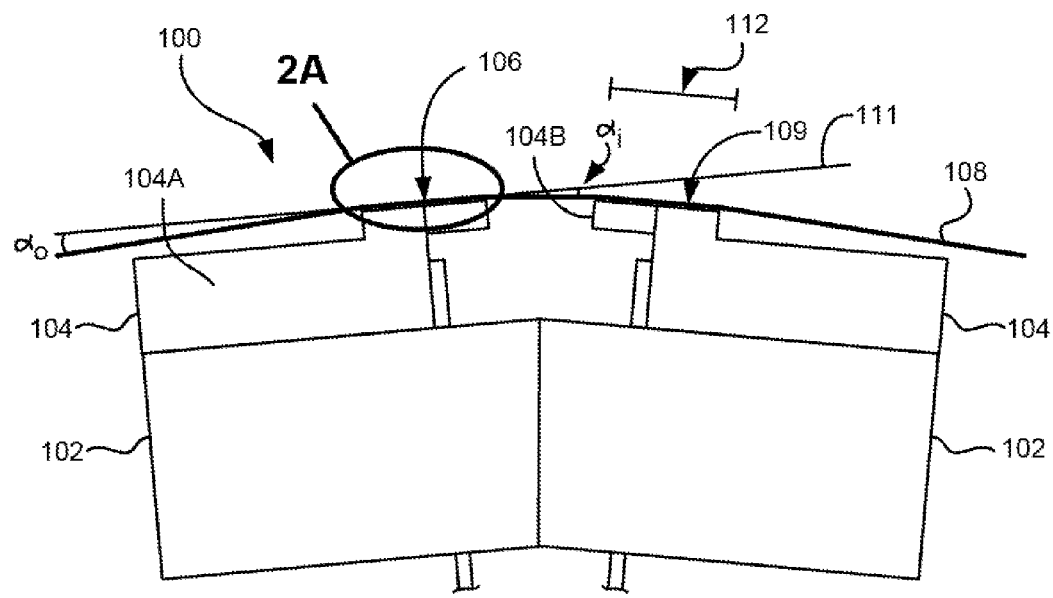
FIG. 1 illustrates a traditional flat-lapped magnetic tape head, in accordance with the prior art.
Figure 2A:
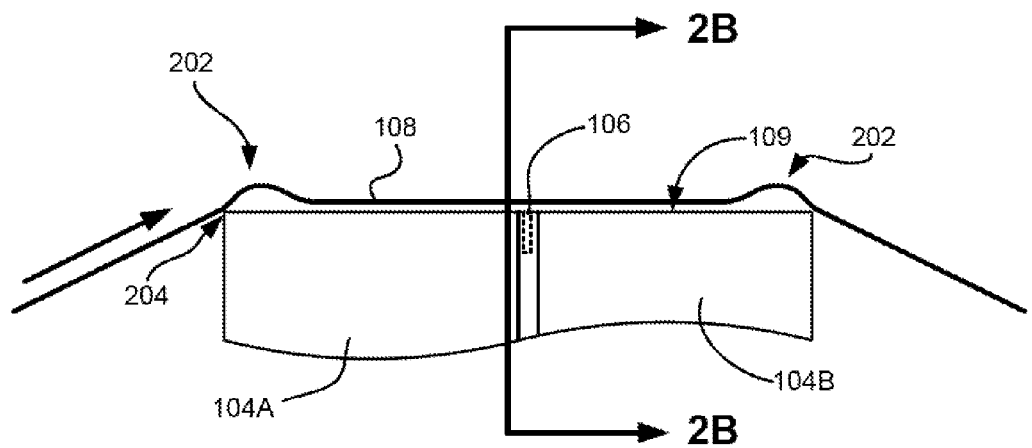
FIG. 2A is an enlarged view of Circle 2A of FIG. 1, showing a first and second known effect associated with the use of the head of FIG. 1.
Figure 2B:
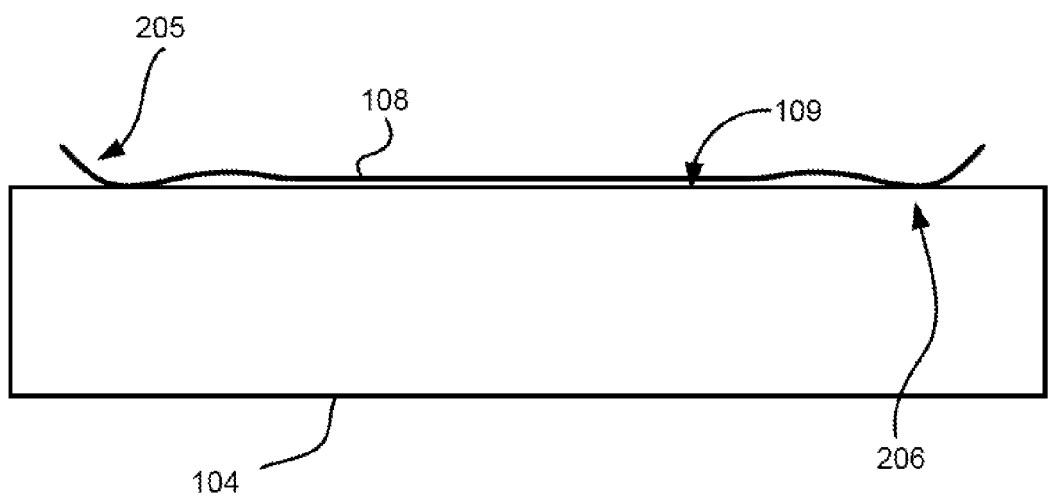
FIG. 2B is a cross-sectional view taken along Line 2B of FIG. 2A, showing a third known effect associated with the use of the head of FIG. 1.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each and any of the various possible combinations and permutations.

In the drawings, like and equivalent elements are numbered the same throughout the various figures.

The embodiments described below disclose new tape drive systems that exhibit more constrained tape-head contact than systems such as those described with reference to FIG. 1. An embodiment of the present invention generally includes a support for engaging a tape; and a head directly opposing the support such that a tape engaging the support is positioned between the head and the support, the head being for performing at least one of reading from a tape and writing to a tape. During an operation period, e.g., when the head is reading from or writing to a tape, the head is positioned such that at least one of the following occurs: the head does not contact the tape for a majority of the operation period; the head does not contact the tape for at least a portion of the operation period; and the head engages the tape for at least a portion of the operation period, the head pressing the tape towards the support when engaging the tape.

One or more embodiments presented herein, or permutations thereof, reduce or address concerns associated with prior art systems such as those described with reference to FIG. 1, including head wear and spacing loss; debris accumulation on the head, particularly on skiving edges; stiction (the tendency of the tape to stick to the head after a period of inactivity) and running friction; setting the tape wrap angles relative to the head; and tape motion disturbances.

As noted above, a support may be present. As will be described in more detail below, a tape engaging portion of the support may have a rounded shape, e.g., such as a circular, arcuate, or a semi-cylindrical shape. For example, the support may include a roller or fixed surface adapted for engaging a tape wrapped around at least a portion of an outer surface thereof. Alternatively, the support may have a shape that is non-semicylindrical, e.g., such as having a nonuniform curvature, a shape conforming to a portion of a Cornu spiral, etc. Such shapes are believed to minimize tape-induced wear.

Figure 3A:
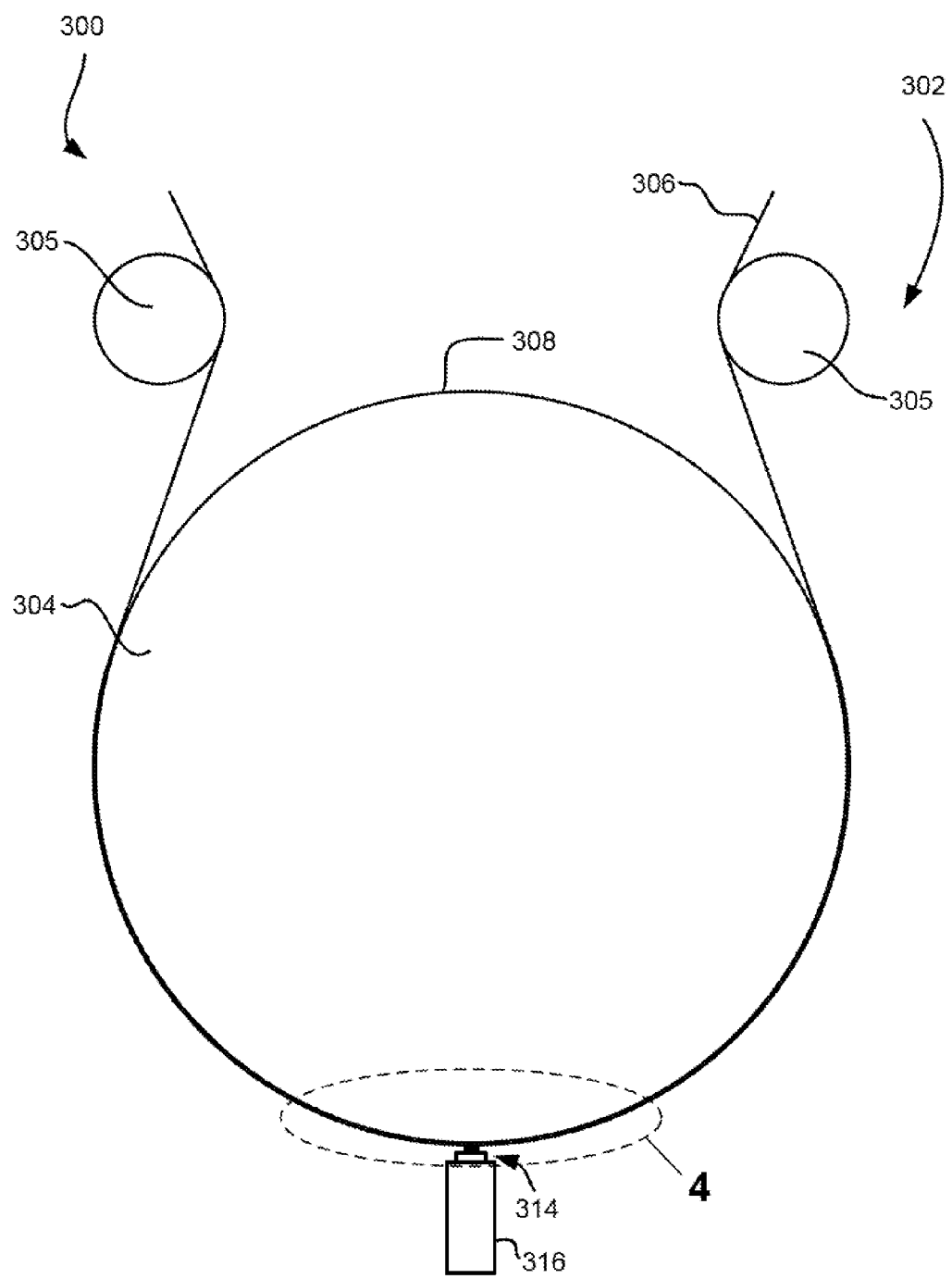
FIG. 3A is a schematic diagram of a tape drive system according to one embodiment of the present invention.

In one preferred embodiment, shown in FIG. 3A, a tape drive system 300 includes a tape guide assembly 302. The tape guide assembly 302 includes a support 304 and optional secondary guides 305. The tape 306 is wrapped around at least a portion of the support's outer surface 308. The head 314 is shown mounted conventionally, if desired, on an actuator 316.

In use, the tape 306 is threaded around the support 304. Suitable threading mechanisms are known in the art, and may include or be a variant of the threading mechanisms such as those used in Video Cassette Recorder (VCR) machines or Linear Tape Open (LTO) machines. The head 314 and/or support 304 are adjusted such that the head 314 is positioned very close to or in contact with the tape 306. In preferred embodiments, the head 314 either flies above the tape on an air bearing, or has minimal contact with the tape.

The support 304 may be rotational. As the support 304 rotates, the backside of the tape 306 contacts the rotating outer surface 308 of the support 304 and the tape 306 is carried in front of or across the head 314.

As noted above, tape lateral motion and skew during reading or writing is undesirable. With continued reference to FIG. 3A, tape lateral motion may be controlled in the regime where the tape 306 and the support 304 are contacting. For example, the outer surface of the support 304 may be textured. This increases the sliding friction between tape 306 and support 304, which is important for limiting sporadic and other lateral transients. In one embodiment, the outer surface 308 of the support 304 has channels or grooves extending circumferentially therealong. Other illustrative texturing includes cross hatching, raised regions, etc. The texturing can be uniform or nonuniform along the outer surface of the support 304.

In some cases, particularly with thinner tapes, texturing may translate through the tape and interfere with reading or writing. To address this possibility, in some embodiments, the support 304 may be porous and/or have apertures therein that allow air to bleed through the outer surface of the support into, e.g., a void into the support, vents to the atmosphere, etc. For example, the porous surface can be formed of spray on ceramic.

In other embodiments, channels may be formed in the support 304 to allow air to bleed out, much in the same way channels on automotive tires allow water to escape. The channels may be machined into the support, formed by laser scribing, etc. A preferred width of such channels is about 5 microns, but could be higher or lower. The depth of the channels should be sufficient to allow air to escape. In one embodiment, the depth of the channels is about the same as the width of the channels. However, the depth could be 2×, 3×, etc. the width, or less than the width.

Other embodiments may include some type of high friction material, such as a polymeric material, e.g., urethane, formed on the tape bearing surface of the support that acts to grip the tape. This also further reduces lateral translation of the tape.

The tape may also be pulled down to the surface of the transport through vacuum, increased tape tension, or other means.

Therefore, in addition to head/tape interface benefits, less tape disturbance and better servo positioning may result.

The back coat of the tape 306 may be intentionally textured to help it wind onto the takeup reel without excess air build up between wraps on the reel. This roughness also enhances the anchoring of the tape 306 to the support 304.

The support 304 may also allow an air bearing to be formed between the support 304 and the tape 306. In such case, the tape engaging portion can be considered to be that portion of the support 304 proximate the tape, though not necessarily touching the tape 306 during periods of operation. In one such embodiment, the support 304 has a smooth tape bearing surface 308, such that air is entrained between the tape 306 and support 304.

The support 304 may also be nonrotational. In that case, the tape 306 slides over the tape bearing surface 308 thereof. The tape bearing surface 308 may be smooth (e.g., to induce formation of an air cushion between the tape 306 and support 304) or for example have a series of small holes for forcing an air cushion between head and tape.

Figure 4:
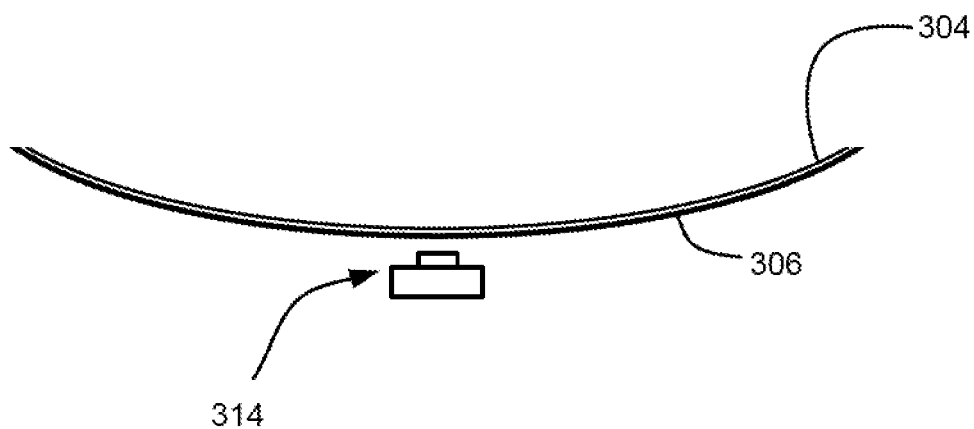
FIG. 4 is a detail diagram taken from Circle 4 of FIG. 3A.

FIG. 4 illustrates the position of the head 314 relative to a support 304 in one embodiment where the head 314 flies above the tape 306 during at least a portion of the operation period. In the embodiment shown, a cushion of air may be formed between the support 304 and tape 306. Further, the length of the support in contact with the tape may be minimized to minimize sliding friction between the tape and support. As shown, the head 314 is spaced slightly from the tape 306. In such an embodiment, the head 314 may ride above the tape 306 on an air bearing induced by air flow drawn between the head 314 and the tape 306 by movement of the tape. This principle is similar to the principles of hard disk drive sliders that flies on an air bearing above a rotating magnetic disk, and similar technology may be implemented. For instance, the head 314 may be biased towards the tape 306, the head 314 having an aerodynamic shape that induces the head to lift off of the tape. Accordingly, one practicing such an embodiment may be able to benefit from the technologies already developed for hard disk drives for controlling and minimizing flyheight.

The head 314 may also be in contact with the tape 306. Preferably, the head/tape contact, and/or friction induced thereby, is minimal.

Figure 3B:
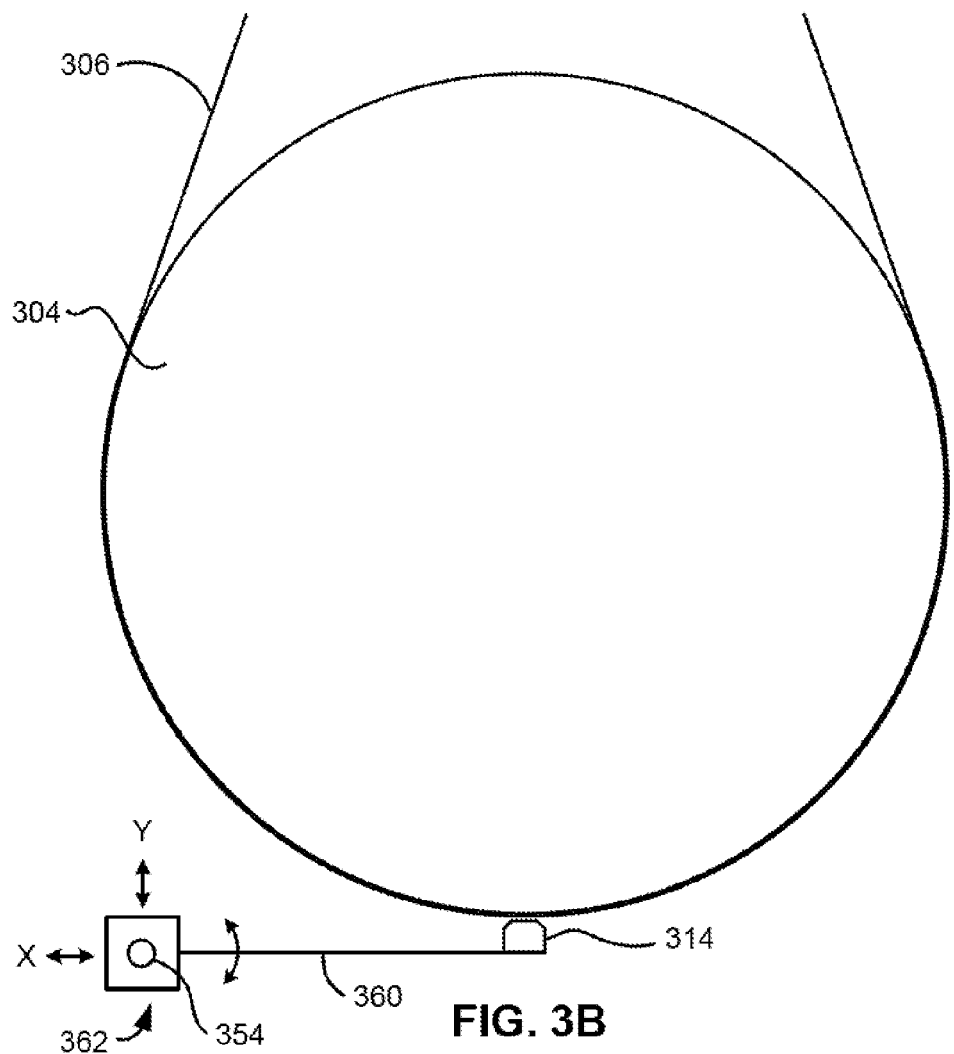
FIG. 3B is a schematic diagram of a tape drive system according to one embodiment of the present invention.
Figure 3C:
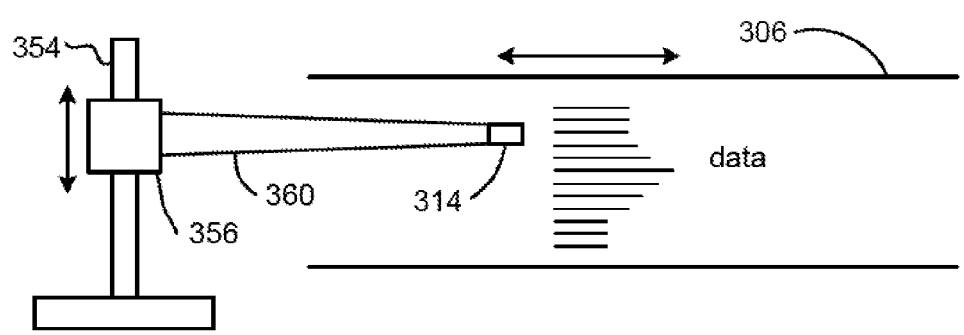
FIG. 3C is a schematic diagram of a tape drive system according to one embodiment of the present invention.

In this and other particularly preferred embodiments, the elements of the head should be positioned at the point of closest approach of the tape and head. In one embodiment, the head is positioned at design time to place the elements at the point of closest approach. This may be accomplished by pivoting and properly positioning the support for the head. In a particularly preferred approach, shown in FIGS. 3B and 3C, the head 314 is supported by a member 360 such as a flexure. The end 362 of the member opposite the head 314 can be positioned in the X and Y axes, and relative to the axis of the support 304, such that the elements of the head 314 are positioned at the point of closest approach of the tape 306. In the embodiment shown, the end 362 of the member opposite the head 314 may also allow pivoting of the member 360 about a pivot guide 354.

Also, the head 314 should move laterally across the tape 306 to allow movement from data track to data track. Such movement may be linear, enabled by allowing the head to move back and forth. For example, an actuation device 356 or system, e.g., worm gear, piezo actuator, etc., may be used to position the head 314 laterally. In another approach, such movement could also be arcuate, such as where the head supporting member pivots at an end opposite the point of attachment of the head.

Figure 5:
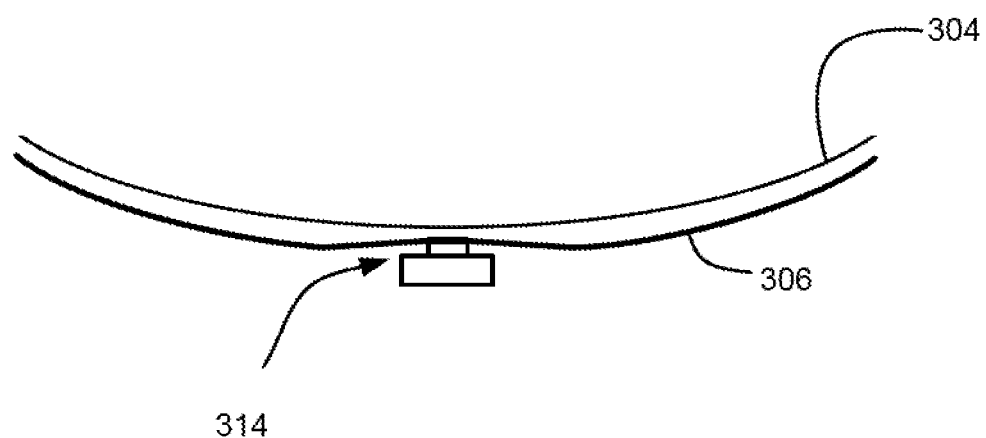
FIG. 5 is a detail diagram according to another embodiment.

FIG. 5 illustrates the position of the head 314 relative to a support 304 in one embodiment where a cushion of air is formed between the support 304 and tape 306. As shown, the tape 306 may wrap around the head 314 very slightly. This embodiment provides very close spacing between the tape 306 and the head elements, in a manner that permits less precise alignment between head 314 and tape 306 than with a head 314 which engages a tape 306 positioned directly against a hard backing. The attack angle may be set by adjusting the amount of head penetration or insertion into the air cushion between the tape 306 and the support 304.

Note that in embodiments where the head may engage the tape, it is preferred that the head disengage from the tape during at least some periods when no writing or no reading is performed, such as during rewind (to reduce head wear), after a predetermined period of activity (to further reduce the possibility of tape-head stiction), etc.

Figure 6:
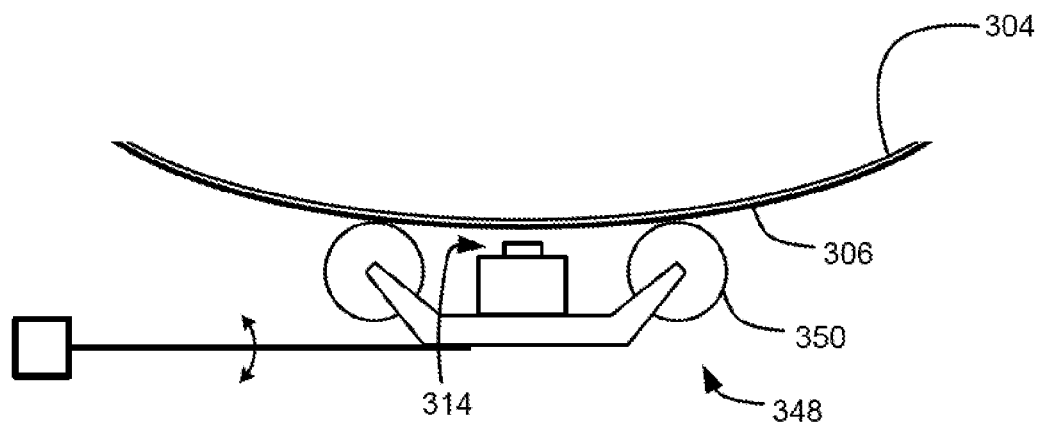
FIG. 6 is a detail diagram according to another embodiment.
Figure 7:
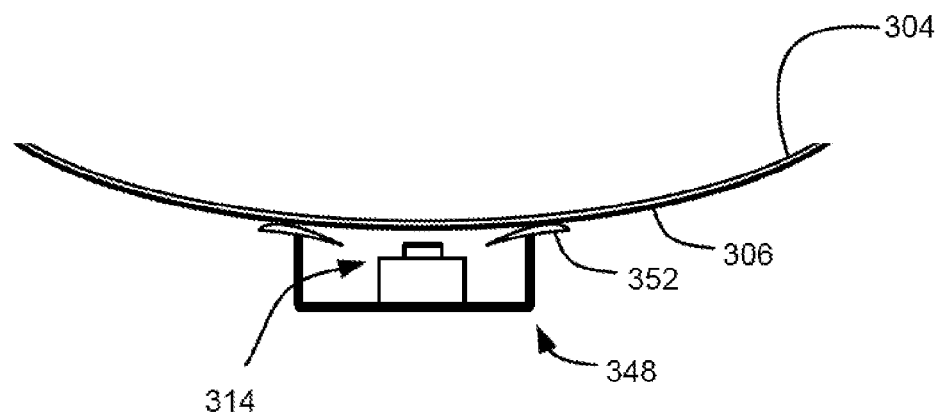
FIG. 7 is a detail diagram according to another embodiment.

FIGS. 6 and 7 illustrate embodiments where a spacing mechanism 348 such as a rolling device 350 or sled 352 is operatively coupled to the head 314 and engages at least one of the support 304 and the tape 306 for setting a position of the head relative to the support 304. In such embodiments, an actuation device such as a piezo actuator may be used to control the tape-head spacing.

In nonrotational embodiments, to minimize wear, the support 304 may be constructed of a hard, wear resistant ceramic, such as AlTiC. Other suitable materials include hard metals such as stainless steel, etc.

In various embodiments, because the tape 306 is positioned between the head 314 and support 304, there is ample room for the head, cables, etc. in the drive housing.

The head 314 can have a flat tape bearing surface, rounded tape bearing surface, and combinations thereof.

The actuator 316 can be any type of actuator. For example, the actuator 316 may include a coarse actuator, a fine actuator, or both. The head/actuator assembly pivots down in the drawing to enable loading and unloading of the tape 306.

Any of the above embodiments or combinations of portions thereof can also be applied to any type of tape head and magnetic tape recording systems, both known and yet to be invented. For example, the teachings herein are easily adaptable to piggyback heads, which typically include opposing modules each having an array of readers and writers configured to provide read-while-write capability.

Figure 8:
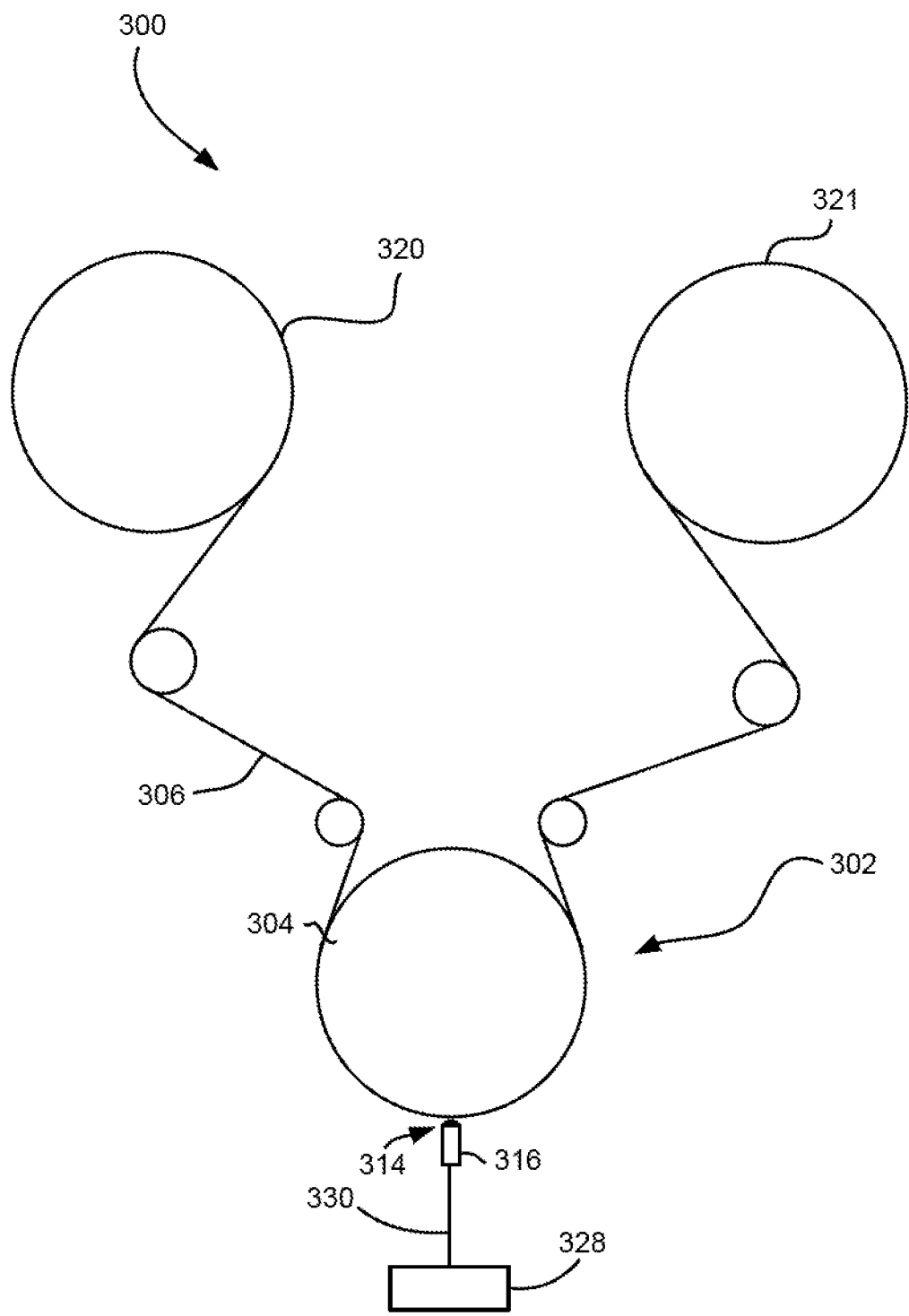
FIG. 8 is a schematic diagram of a tape drive system according to one embodiment of the present invention.

FIG. 8 illustrates a simplified tape drive system 300 which may be employed in the context of the present invention. While one specific implementation of a tape drive system is shown in FIG. 8, it should be noted that the embodiments of the previous figures may be implemented in the context of any type of tape drive system.

As shown, a tape supply reel 320 and a take-up reel 321 are provided to support a tape 306. These may form part of a removable cassette and are not necessarily part of the system. A guide assembly 302 guides the tape 306 across a preferably bidirectional tape head 314. Such tape head 314 is in turn coupled to a controller assembly 328 via a connector cable 330. The controller 328, in turn, performs head functions such as servo reading, data writing, data reading, etc. An actuator 316 controls data track positioning of the head 314 relative to the tape 306, and may operate under control of the controller.

A tape drive, such as that illustrated in FIG. 8, may include drive motor(s) to drive the take-up reel 321, and optionally, tape supply reel 320 and support 304, to move the tape 306 linearly over the head 314. The tape drive system 300 also includes a read/write channel to transmit data to the head 314 to be recorded on the tape 306 and to receive data read by the head 314 from the tape 306. An interface is also provided for communication between the tape drive system and a host (integral or external) to send and receive the data and for controlling the operation of the tape drive and communicating the status of the tape drive to the host, all as will be understood by those of skill in the art.

Figure 9:
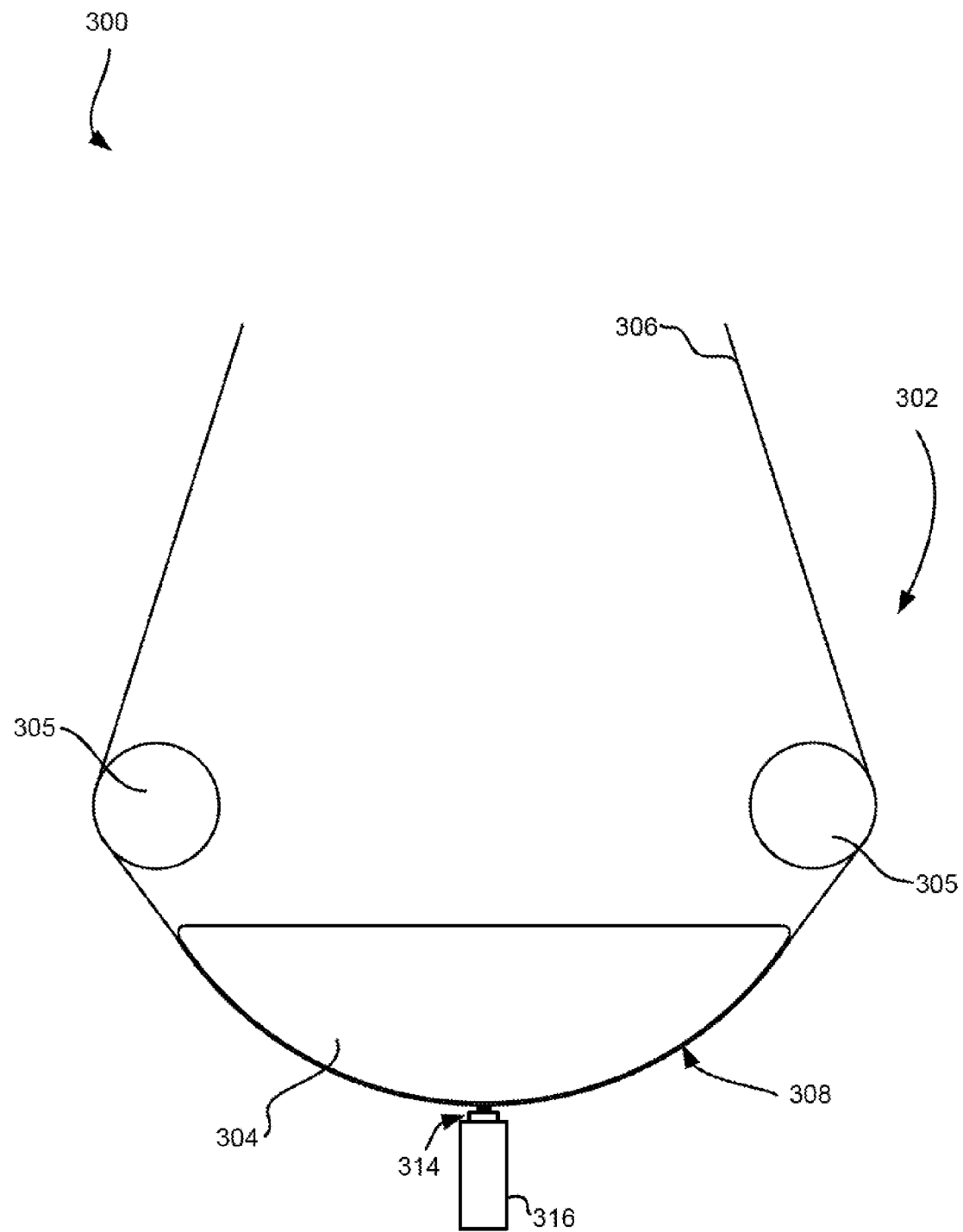
FIG. 9 is a schematic diagram of a tape drive system according to one embodiment of the present invention.

In other embodiments, the tape engaging portion may have a shape corresponding to a semicircle, irregular-radius semicircle, arc, a portion of a Cornu spiral, etc. The principles of operation of such systems are similar to those presented above. FIG. 9 illustrates a tape drive system 300 according to one embodiment, where the support 304 has a semicircular tape bearing surface 308.

Figure 10:
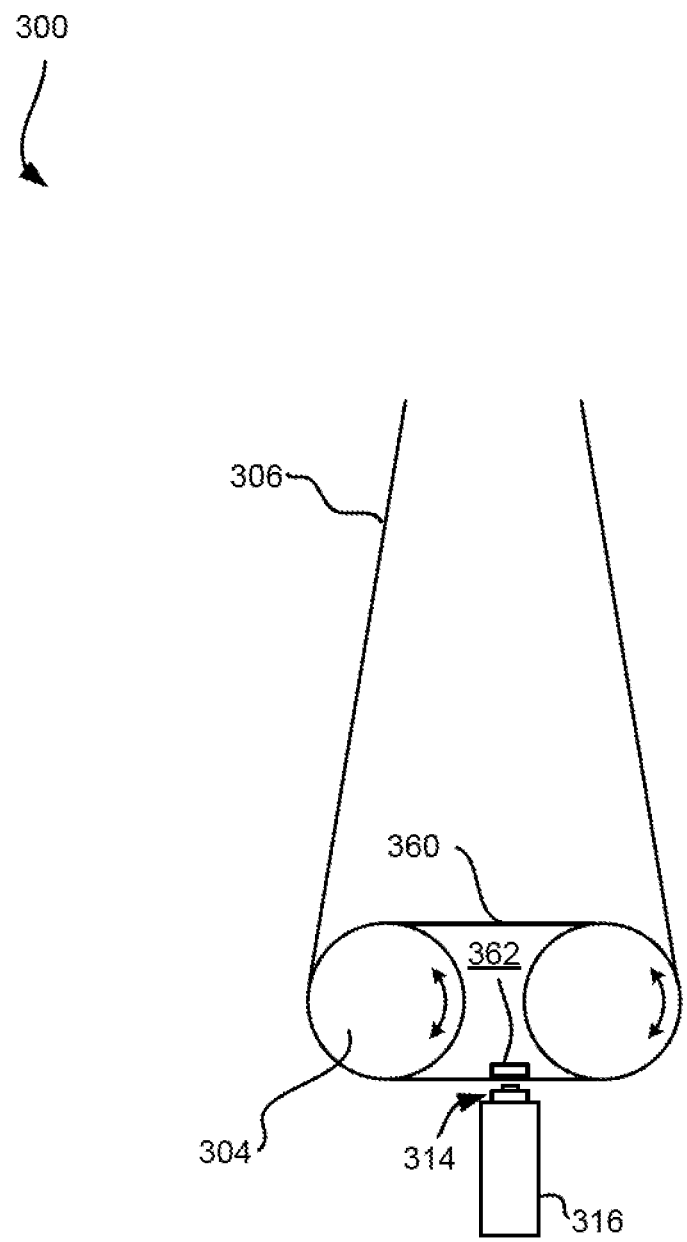
FIG. 10 is a schematic diagram of a tape drive system according to one embodiment of the present invention.
Figure 11:
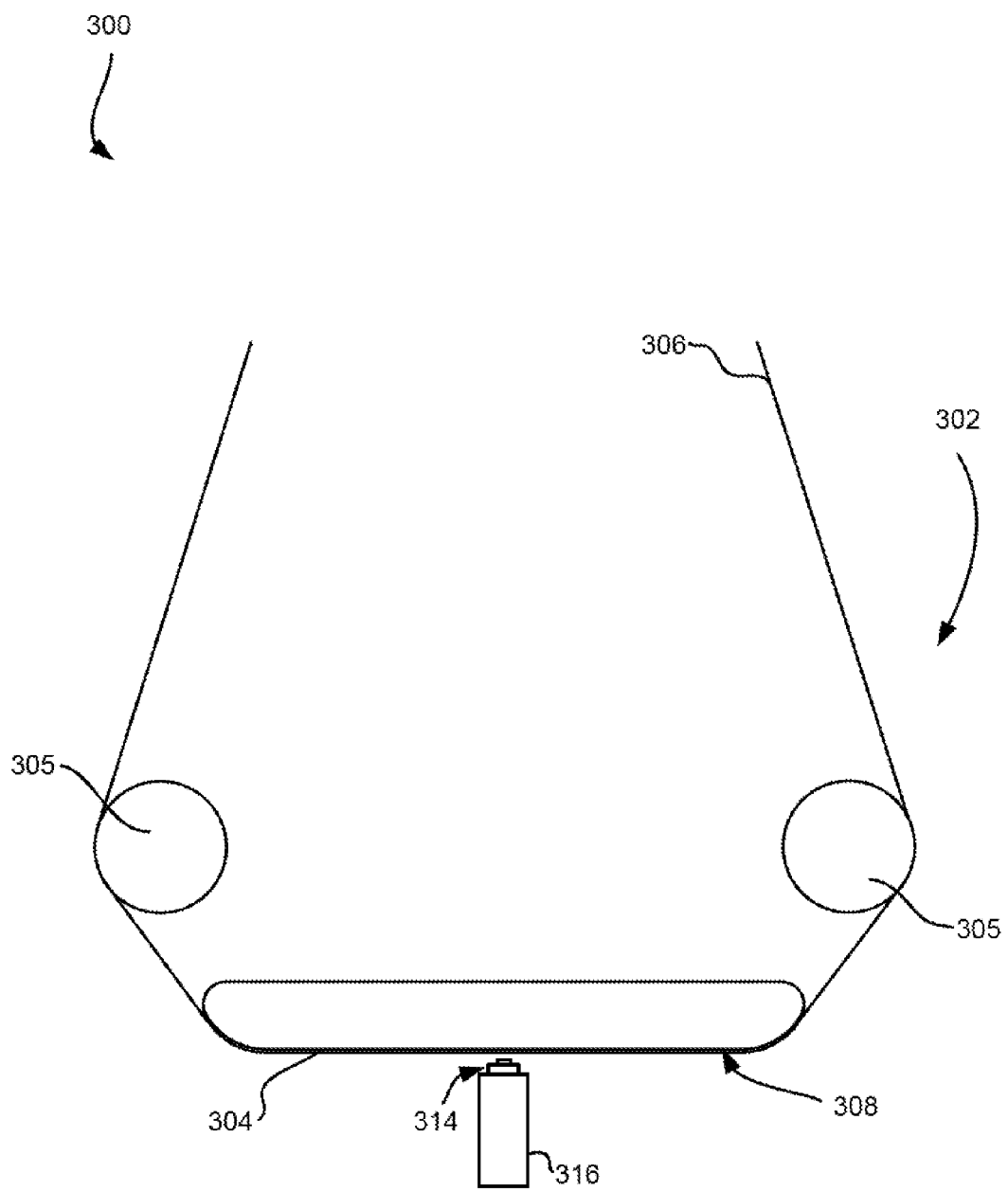
FIG. 11 is a schematic diagram of a tape drive system according to one embodiment of the present invention.

In a further embodiment, the support has a planar tape engaging portion proximate the head. The principles of operation of such systems are similar to those presented above. FIG. 10 illustrates one such embodiment 300. As shown, the tape 306 wraps around a support 304 having a conveyor 360 that moves with the tape. An optional backing 362 may be positioned near the head 314 to stabilize the conveyor 360 adjacent the head. In another embodiment 300, shown in FIG. 11, the support 304 may have rounded ends, while having a straight tape engaging portion proximate the head 314.

Figure 12:
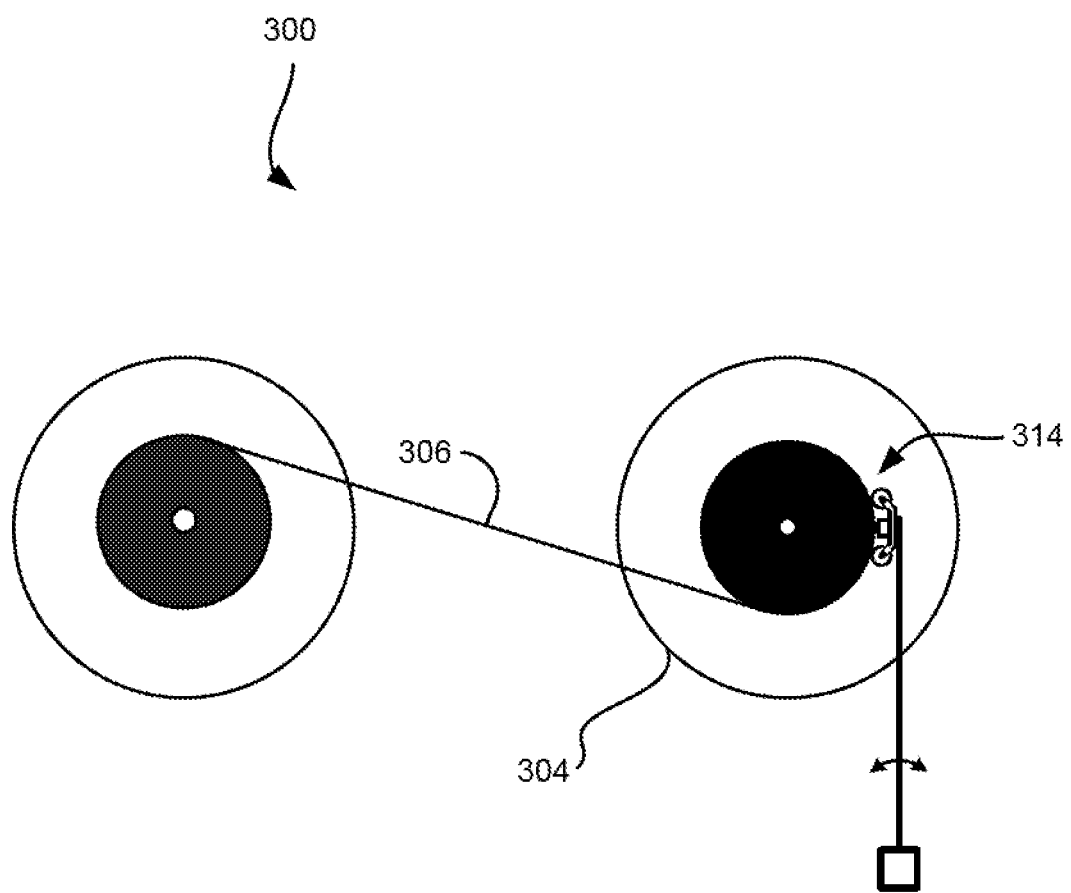
FIG. 12 is a schematic diagram of a tape drive system according to one embodiment of the present invention.

In a further embodiment, the support is a spool around which a tape is wrapped. Referring to FIG. 12, the head 314 follows the outer periphery of the tape coil as it is wound onto or off of the spool (support) 304. An actuator may be used to control the head/tape spacing or head biasing. A spacing device, such as those shown in FIGS. 6-7 can also be used to control the head/tape spacing or head biasing.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tape drive system, comprising:
   a support for engaging a tape, a tape engaging portion of the support having a rounded shape; and
   a head directly opposing the tape engaging portion of the support, the head being for performing at least one of reading from a tape and writing to a tape,
   wherein, during an operation period when the head is reading from or writing to a tape, the head is positioned such that at least one of the following occurs:
      the head does not contact the tape for a majority of the operation period;
      the head does not contact the tape for at least a portion of the operation period; and
      the head engages the tape for at least a portion of the operation period when the tape is lifted from the support by a cushion of air formed between the support and the tape, the head pressing the tape into the air cushion when engaging the tape.

2. The tape drive system as recited in claim 1, wherein the support includes a roller adapted for engaging a tape wrapped around at least a portion of an outer surface thereof.

3. The tape drive system as recited in claim 2, wherein an outer surface of the roller is textured.

4. The tape drive system as recited in claim 3, wherein an outer surface of the roller has grooves extending circumferentially therealong.

5. The tape drive system as recited in claim 1, wherein the support has a shape that is non-semicircular.

6. The tape drive system as recited in claim 1, wherein the support has a straight tape engaging portion proximate the head.

7. The tape drive system as recited in claim 1, wherein the support has a shape that allows an air bearing to be formed between the support and a tape engaging the support.

8. The tape drive system as recited in claim 1, wherein the support does not rotate.

9. The tape drive system as recited in claim 1, wherein the support is a spool around which a tape is wrapped.

10. The tape drive system as recited in claim 1, wherein the head is biased towards the support.

11. The tape drive system as recited in claim 1, wherein the head rides above the tape on an air bearing for at least a portion of the operation period.

12. The tape drive system as recited in claim 1, further comprising a spacing mechanism operatively coupled to the head and engaging at least one of the support and the tape for setting a position of the head relative to the support.

13. The tape drive system as recited in claim 1, wherein the head is coupled to a member, wherein an end of the member opposite the head is positioned relative to the support such that elements of the head are positioned at a point of closest approach to the tape.

14. The tape drive system as recited in claim 1, wherein the head disengages from the tape during at least some periods of no writing and no reading.

15. A tape drive system, comprising:
   a support for engaging a tape, wherein the support includes a roller adapted for engaging a tape wrapped around at least a portion of an outer surface thereof; and
   a material layer on a tape bearing surface of the roller of the support, the material layer being for increasing friction between the tape and the support,
   wherein, during an operation period when the head is reading from or writing to a tape, the head is positioned such that at least one of the following occurs:

the head does not contact the tape for a majority of the operation period;

the head does not contact the tape for at least a portion of the operation period; and the head engages the tape for at least a portion of the operation period when the tape is lifted from the support by a cushion of air formed between the support and the tape, the head pressing the tape into the air cushion when engaging the tape.

16. The tape drive system as recited in claim 15, further comprising a head directly opposing the support such that a tape engaging the support is positioned between the head and the support, the head being for performing at least one of reading from a tape and writing to a tape.

17. The tape drive system as recited in claim 16, wherein the head rides above the tape on an air bearing for at least a portion of the operation period.

18. The tape drive system as recited in claim 15, wherein the material of the material layer is a polymeric material.

* * * * *